United States Patent
Radocaj

(10) Patent No.: US 10,132,356 B2
(45) Date of Patent: Nov. 20, 2018

(54) WASHER WITH STEP

(71) Applicant: Mijo Radocaj, Massillon, OH (US)

(72) Inventor: Mijo Radocaj, Massillon, OH (US)

(73) Assignee: Mijo Radocaj, Massillon, OH (US)

( * ) Notice: Subject to any disclaimer, the term of this patent is extended or adjusted under 35 U.S.C. 154(b) by 2 days.

(21) Appl. No.: 15/439,411

(22) Filed: Feb. 22, 2017

(65) Prior Publication Data

US 2018/0238392 A1    Aug. 23, 2018

(51) Int. Cl.
| | |
|---|---|
| F16C 19/10 | (2006.01) |
| F16C 19/06 | (2006.01) |
| F16C 33/80 | (2006.01) |
| F16C 19/32 | (2006.01) |
| F16C 33/72 | (2006.01) |
| F16H 55/36 | (2006.01) |
| F16C 35/067 | (2006.01) |
| F16C 19/44 | (2006.01) |
| F16C 33/78 | (2006.01) |
| F16C 33/76 | (2006.01) |
| F16H 7/08 | (2006.01) |

(52) U.S. Cl.
CPC ............ *F16C 35/067* (2013.01); *F16C 19/06* (2013.01); *F16C 19/10* (2013.01); *F16C 19/44* (2013.01); *F16C 33/763* (2013.01); *F16C 33/7846* (2013.01); *F16C 33/80* (2013.01); *F16H 55/36* (2013.01); *F16C 2240/46* (2013.01); *F16C 2300/02* (2013.01); *F16H 2007/0865* (2013.01)

(58) Field of Classification Search
CPC ........ F16C 35/067; F16C 19/06; F16C 19/10; F16C 2300/02; F16C 33/763; F16C 33/785; F16C 33/805; F16C 2240/46; F16C 33/80; F16C 33/7846; F16H 55/36; F16H 2007/0865
USPC ............... 384/480, 485, 488, 490, 535, 417; 474/197, 199

See application file for complete search history.

(56) References Cited

U.S. PATENT DOCUMENTS

| | | | | |
|---|---|---|---|---|
| 3,285,785 A | * | 11/1966 | Shannon | H01M 2/307 277/637 |
| 3,580,397 A | * | 5/1971 | Triplett | A47H 1/102 211/105.4 |
| 3,693,469 A | * | 9/1972 | Ozaki | B62K 23/06 74/489 |
| 4,518,372 A | * | 5/1985 | Dye | F16C 13/006 474/199 |

(Continued)

FOREIGN PATENT DOCUMENTS

| | | | | |
|---|---|---|---|---|
| DE | 102015220708 A1 | * | 4/2016 | ............ F16C 19/166 |
| JP | 2010164129 A | * | 7/2010 | ................ F16B 5/02 |

*Primary Examiner* — Marcus Charles

(57) ABSTRACT

There is described herein an apparatus comprising a shoulder washer that comprises a shank, a shoulder coupled with the shank, a bore passing through the shank and the shoulder, and a step. The step is coupled with the shoulder and at least partially encircles the shank where the shank meets the shoulder. In other embodiments, the apparatus is employed with a bearing, where the step is selected to provide a gap that allows the bearing to freely rotate while engaged with the aforementioned apparatus. In yet other embodiments, flat washers may have employed shoulder bearings that do not have steps for engaging a bearing and providing a gap that is allows the bearing to freely rotate while engaged with the shoulder washers.

17 Claims, 5 Drawing Sheets

(56) References Cited

U.S. PATENT DOCUMENTS

| | | | |
|---|---|---|---|
| 5,055,015 A | 10/1991 | Furukawa | |
| 5,122,022 A * | 6/1992 | Kluser | E04F 13/0853 |
| | | | 411/384 |
| 6,244,779 B1 * | 6/2001 | Slasinski | F16C 11/10 |
| | | | 403/110 |
| 6,357,926 B1 * | 3/2002 | Hauck | F16C 13/006 |
| | | | 384/546 |
| 7,011,593 B2 * | 3/2006 | Schenk | F16C 13/006 |
| | | | 384/477 |
| 7,059,775 B2 | 6/2006 | Landrieve | |
| 7,445,022 B2 | 11/2008 | McCoy | |
| 7,803,079 B2 | 9/2010 | Sakamoto et al. | |
| 8,651,988 B2 * | 2/2014 | Kapfer | F16C 13/006 |
| | | | 474/101 |
| 9,428,900 B2 * | 8/2016 | Wroblewski | E03F 5/0407 |
| 9,555,741 B2 * | 1/2017 | Di Giusto | B60R 1/076 |
| 2002/0086754 A1 * | 7/2002 | Fukuwaka | F16C 33/416 |
| | | | 474/199 |
| 2003/0144102 A1 * | 7/2003 | Lin | F16C 33/76 |
| | | | 474/199 |
| 2007/0074879 A1 * | 4/2007 | Frasier | A01B 71/04 |
| | | | 172/604 |
| 2010/0016109 A1 * | 1/2010 | Walton | F16H 55/50 |
| | | | 474/199 |
| 2012/0142470 A1 * | 6/2012 | Varnnoux | F16C 13/006 |
| | | | 474/199 |
| 2015/0275976 A1 | 10/2015 | Tanaka et al. | |
| 2016/0102749 A1 | 4/2016 | Ishikura | |
| 2016/0116050 A1 * | 4/2016 | Arnault | F16C 19/166 |
| | | | 474/199 |
| 2017/0321411 A1 * | 11/2017 | Junca | E03D 11/16 |

\* cited by examiner

WASHER WITH STEP

TECHNICAL FIELD

The present disclosure relates generally to bearing protection.

BACKGROUND

Bearing, such as ball bearings, roller bearings, needle bearings or thrust bearings, are used to help reduce friction. Some bearings may be sealed with rubber seals between the outer ring and inner ring to protect the bearing from dust and any possible contamination.

BRIEF DESCRIPTION OF THE DRAWINGS

The accompanying drawings incorporated herein and forming a part of the specification illustrate the example embodiments.

SUMMARY OF INVENTION

Figure 1:
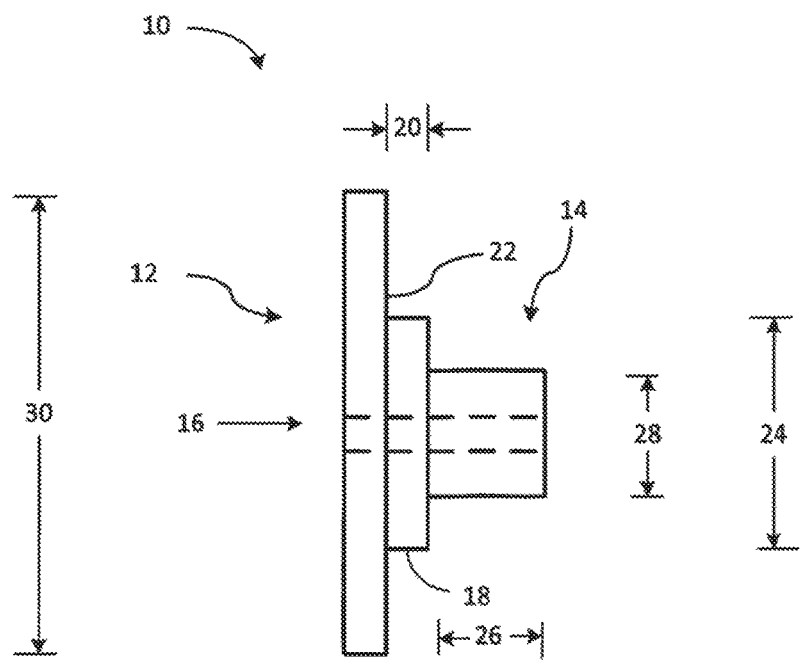
FIG. 1 is a side view of a shoulder washer with a step.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus comprising a shoulder washer. The shoulder washer comprises a shank, a shoulder coupled with the shank, a bore passing through the shank and the shoulder, and a step. The step is coupled with the shoulder and at least partially encircles the shank where the shank meets the shoulder.

In accordance with an example embodiment, there is disclosed herein an apparatus comprising a first shoulder washer with a step, a bearing having an inner ring and an outer ring, and first and second sides, and a second shoulder washer with step. The first shoulder washer engages the first side of the bearing and the second shoulder washer engages the second side of the bearing. The step of the first shoulder washer engages the inner ring of the bearing on the first side, and the step of the second shoulder washer engages the inner ring of the bearing on the second side.

In accordance with an example embodiment, there is disclosed herein an apparatus comprising a shoulder washer, a first flat washer, a bearing, a second shoulder washer, and a second flat washer. The first shoulder washer comprises a first shank, a first shoulder coupled with the first shank, and a bore passing through the first shank and the shoulder. The first flat washer having an inner diameter greater an outer diameter of the first shank, allowing the first flat washer to be mounted on the first shank. The bearing having an inner ring and an outer ring, and first and second sides. The second shoulder washer comprises a second shank, a second shoulder coupled with the second shank, and a second bore passing through the second shank and the second shoulder. The second flat washer having an inner diameter greater than an outer diameter of the second shank, allowing the second flat washer to be mounted onto the second shank. The first shoulder washer and second shoulder washer are coupled with the bearing at the first and second sides of the bearing respectively. The first flat washer is disposed on the first shank and engages the inner ring of the bearing on the first side, and the second flat washer is disposed on the second shank and engages the inner ring of the bearing on the second side.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Figures 2, 3:
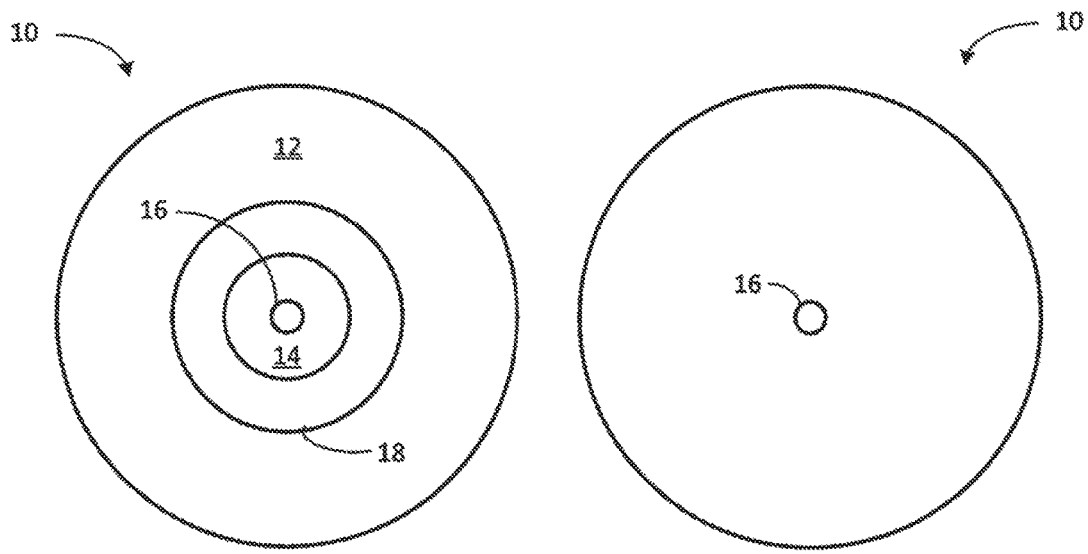
FIG. 2 is a top view of a shoulder washer with a step illustrated in FIG. 1.
FIG. 3 is a bottom view of a shoulder washer with a step illustrated in FIG.

Referring to FIGS. 1-3, there is illustrated a shoulder washer with a step 10. The shoulder washer with a step 10, comprises shoulder 12 and a shank 14. A bore 16 passes through the shoulder 12 and shank 14. A step 18, protrudes a height 20 from the inner surface 22 of the shoulder 12. The step has an outer diameter, or width, 24. In the illustrated example the step fully encircles the shank 14, however, in other example embodiments, the step 18 may only partially encircle the shank 14. The shank 14 has an outer diameter 28 and a length 26 that is measured from step 18. The shoulder 12 has a diameter 30.

Figure 4:
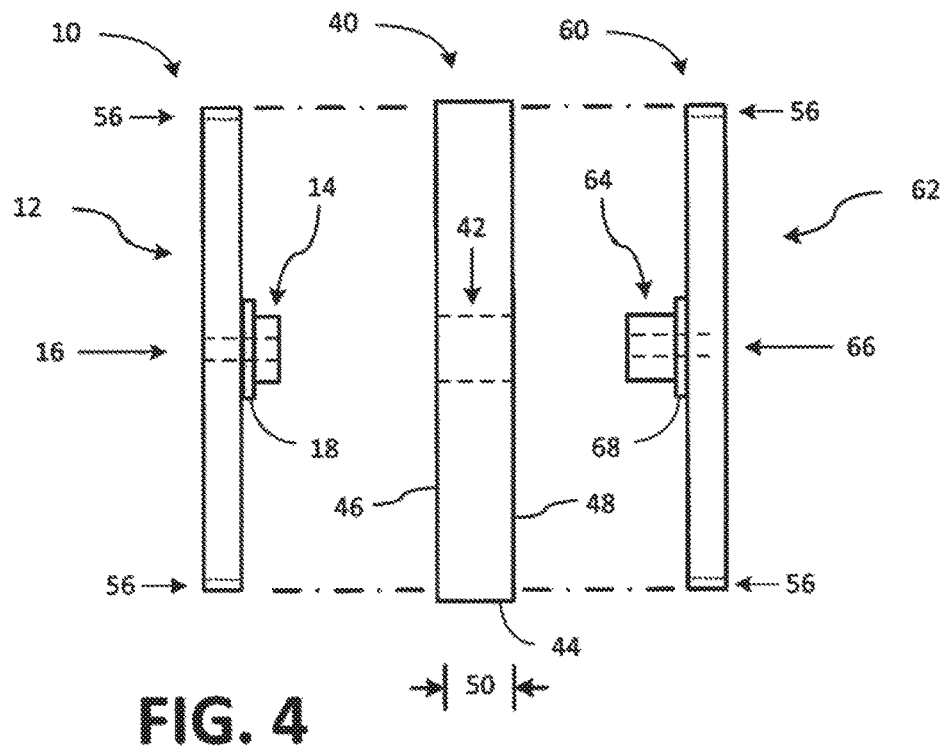
FIG. 4 is an exploded view of a bearing coupled with a pair of shoulder washer with steps.

FIG. 4 is an exploded view of a bearing 40 coupled with a pair of shoulder washers with steps 10, 60. The bearing has an inner ring 42 and an outer ring 44, first and second sides 46, 48 and a width 50. The bearing 40 may be any suitable type of bearing, such as, including but not limited to a ball bearing, a roller bearing, a needle bearing a thrust bearing, or any type of rolling bearing.

The second shoulder washer with step 60, has a bore 66, a step 68 and a shank 64. In an example embodiment, the bore 66 is the same size as bore 16, however, in other embodiments the bores 66, 16 may be different sizes. In an example embodiment, the steps 18, 68 are the same size, however, in other embodiments the steps 18, 68 may differ in height, width, or both. In the illustrated example, shanks 14 and 64 have different lengths; however, those skilled in the art should readily appreciate that shanks 14 and 64 may also have the same length. The first washer with step 10 engages the bearing 40 on a first side 46 while the second washer with step 60 engages the bearing on a second side 48. In an example embodiment, the combined lengths of shanks 14 and 64 are equal to the width 50 of the bearing 40.

In an example embodiment, the step 18 of the first washer 10 engages the inner ring 42 of the bearing 40 on the first side 46. The step 68 of the second washer 60 engages the inner ring 42 of the bearing 40 on the second side 48.

Figure 5:
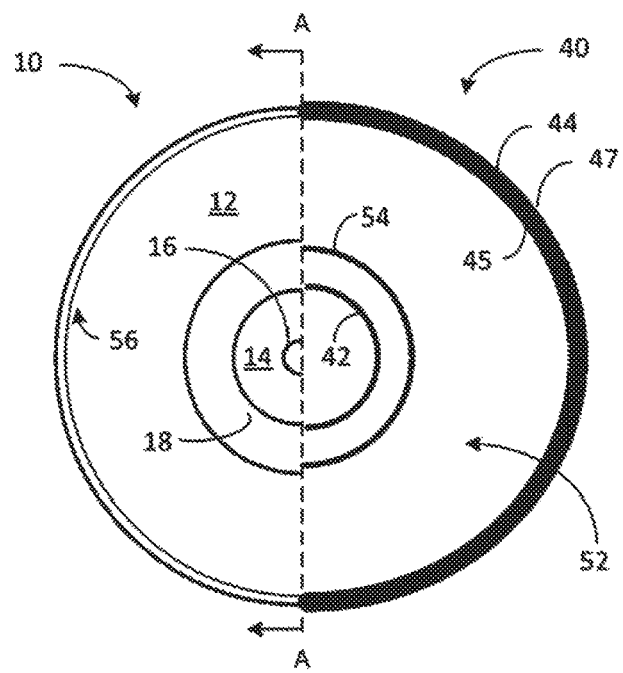
FIG. 5 is a cutaway view of a bearing mounted on a shoulder washer with step.

FIG. 5 is a cutaway view of a bearing 40 mounted on a washer with step 10. The bearing is cutaway at line A-A where the bearing is removed in the area to the left of line A-A to reveal the components underneath the first washer 10. The bearing 40 may optionally comprise a seal 52, which may be present on one or both sides 46, 48 (e.g., the seal on the side 46 may be referred to as a first seal and a seal 48 on the second side may be referred to as a second seal) of the bearing 40. In the illustrated example, the seal has a groove 54.

In an example embodiment, the diameter 30 of the shoulder 12 is between the inner diameter 45 of the outer ring 44 and the outer diameter 47 of the outer ring 44. In particular embodiments, the diameter 30 of the shoulder 12 is closer to the outer diameter 47 of the outer ring 44 than the inner diameter 45 of the outer ring 44. Similarly, the diameter of the shoulder 62 of the second washer 66 is between the inner diameter 45 of the outer ring 44 and the outer diameter 47 of the outer ring 44, and in particular embodiments, the diameter of the shoulder 62 is closer to the diameter 47 than the diameter 45.

In an example embodiment, the step 18 rests upon the inner ring 42 of the bearing 40. In an example embodiment, the width of the step 18 extends beyond groove 54. This can prevent dirt, dust, or other contaminants from reaching the groove 54 and thus can prevent any of the aforementioned contaminants from reaching the interior of the bearing 40. In particular embodiments, the shoulder washers 10, 60 further comprises a labyrinth seal 56. The labyrinth seal 56 may suitable comprise one or more grooves that can be configured into any desired shape. The labyrinth seal 56 can be employed to prevent dirt and other contaminants from entering gaps 70, 72 described in FIG. 6 infra.

Figure 6:
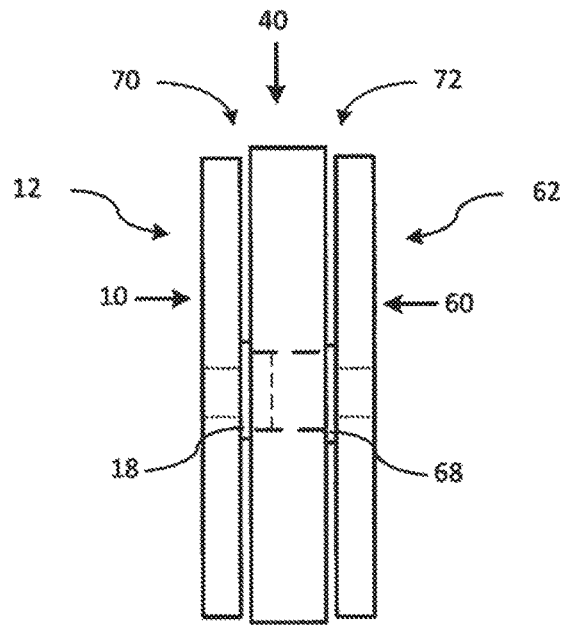
FIG. 6 is a side view of a bearing coupled with a pair of shoulder washers with steps.

FIG. 6 is a side view of a bearing 40 coupled with a pair of shoulder washers with steps 10, 60. The step 18 causes a first gap 70 to be formed between the shoulder of the first washer 10 and the bearing 40. The step 68 causes a second gap 72 to be formed between the second shoulder 62 of the second washer 60. In an example embodiment, first and second gaps 70, 72 are equal, however, in other embodiments first and second gaps 70, 72 may be unequal.

In an example embodiment the height (see e.g., ref. 20 in FIG. 1) of the step 18 is selected so achieve a minimum gap (for the first gap 70) between the shoulder 12 and the bearing 40 that allows the bearing 40 to rotate freely. Similarly, the height of the step 68 is selected to achieve a minimum gap (for the second gap 72 between the shoulder 62 and the bearing 40 that allows the bearing 40 to rotate freely. For example, a gap of 0.008 inches can be sufficient to achieve rotation in rotation.

In an example embodiment, along with selecting step heights to achieve minimum gaps for gaps 70, 72, the diameter of the shoulders 12, 62 may be selected in order to minimize containments from reaching the bearing 40 via gaps 70, 72. For example, the diameters of the shoulders 12, 62 may be selected to extend beyond a bearing seal (see e.g., ref. 52 in FIG. 5). For example, the diameters of the shoulders 12, 62 may be at least the diameter of the inner side 46 (FIG. 5) of the outer ring 44 (FIG. 5).

Figure 7:
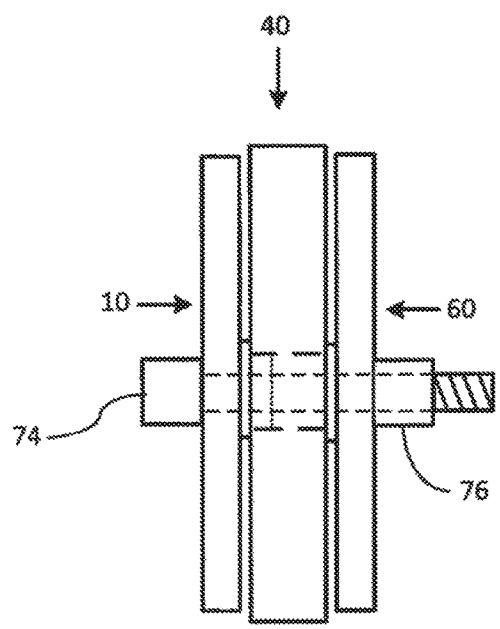
FIG. 7 is a side view of a bearing coupled with a pair of shoulder washers with steps fastened by a fastener.

FIG. 7 is a side view of a bearing coupled with a pair of shoulder washers with steps fastened by a fastener. In the illustrated example, the fastener comprises a bolt 74 coupled with a nut 76. However, those skilled in the art should readily appreciate that any suitable fastener may be employed. For example, the shoulder washers 10, 60 and bearing 40 may be mounted on a shaft which may have threaded end allowing a nut 76 to hold the shoulder washers 10, 60 and bearing 40 in place, or as another example, the shaft may employ a cotter pin to hold the shoulder washers 10, 60 and bearing 40 in place.

Figure 8:
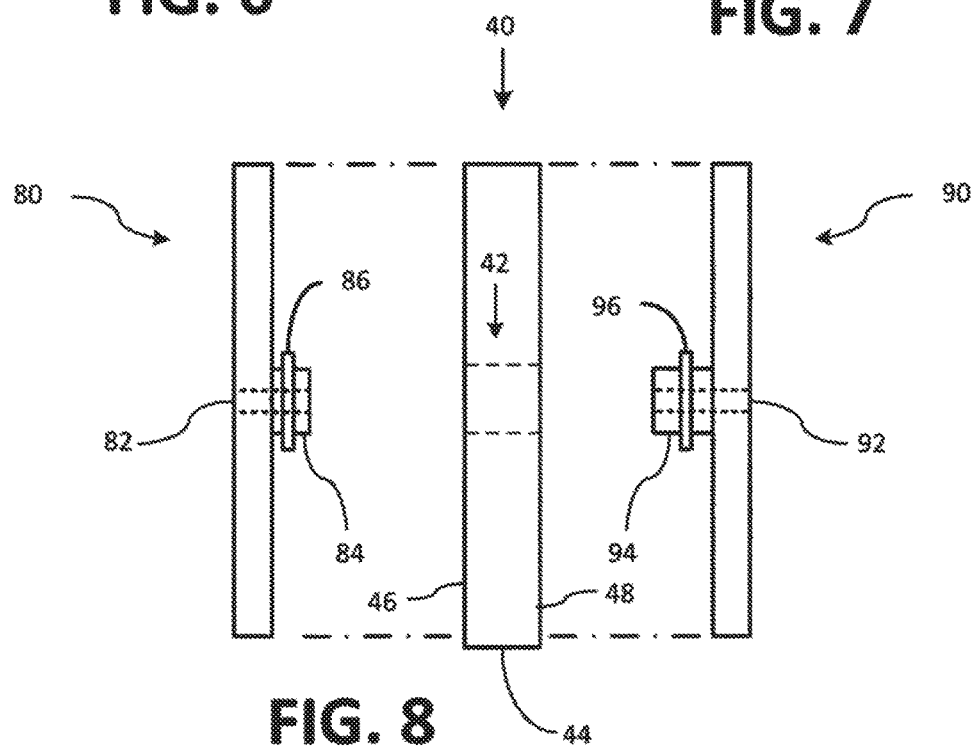
FIG. 8 is an exploded view of a bearing coupled with shoulder washers and flat washers in accordance with an example embodiment.

FIG. 8 is an exploded view of a bearing 40 coupled with shoulder washers 80, 90 having bores 82, 92, and shanks 84, 94 respectively that are coupled with flat washers 86, 96 respectively. The bearing 40 has an inner ring 42 and an outer ring 44, and first and second sides 46, 48. The first shoulder washer 80 and second shoulder washer 90 are coupled with the bearing 40 at the first 46 and second 48 sides of the bearing respectively. The first flat washer 86 is disposed on the first shank 84 and engages the inner ring 42 of the bearing 40 on the first side 46. The second flat washer 96 is disposed on the second shank 94 and engages the inner ring 42 of the bearing 40 on the second side 48.

In an example embodiment, the bearing 40 comprises a seal (see e.g., ref. 52 in FIG. 5). In particular embodiments, the seal has a groove (see e.g., ref. 54 in FIG. 5). The flat washers 86, 88 have a width, or outer diameter, the is sufficient to cover or extend beyond the groove in the seal. This can prevent contaminants from entering the bearing via the inner ring 42.

Figure 9:
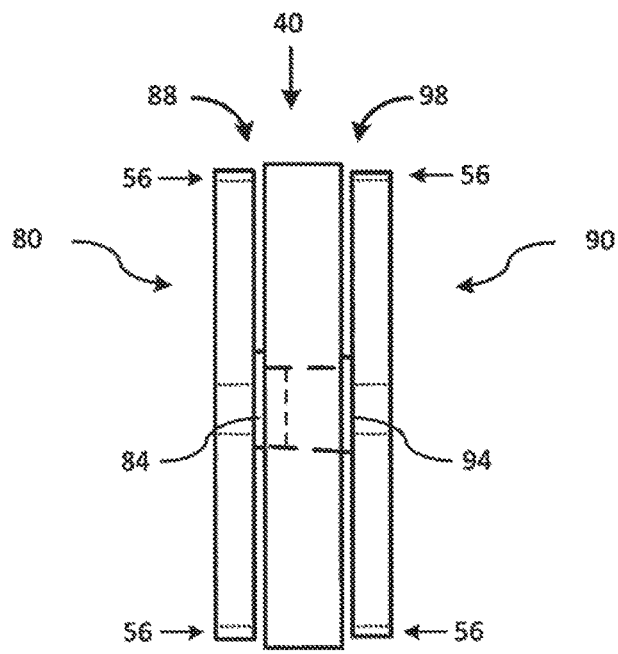
FIG. 9 is a side view of a bearing coupled with a pair of shoulder washers and flat washers.

FIG. 9 is a side view of a bearing 40 coupled with a pair of shoulder washers 80, 90 and flat washers 84, 94. As those skilled in the art can readily appreciate, flat washer 84 causes a gap 88 to be formed between shoulder washer 80 and the bearing 40. The height, (see e.g., ref. 20 in FIG. 1), or thickness, of the flat washer 84 determines the size of the gap 88. Similarly, flat washer 94 causes a gap 98 to be formed between shoulder washer 90 and the bearing 40. The height (see e.g., ref. 20 in FIG. 1) of the flat washer 94 determines the size of the gap 98. In an example embodiment, gaps 88, 98 are equal, however, in other embodiments gaps 88, 98 may be unequal.

In an example embodiment the height (see e.g., ref. 20 in FIG. 1) of the flat washer 84 is selected so achieve a minimum gap (for gap 88) between the shoulder of shoulder washer 80 and the bearing 40 that allows the bearing 40 to rotate freely. Similarly, the height of the flat washer 94 is selected to achieve a minimum gap (for gap 98 between the shoulder of shoulder washer 90 and the bearing 40 that allows the bearing 40 to rotate freely.

In an example embodiment, along with selecting flat washer heights to achieve minimum gaps for gaps 88, 98, the diameter of the shoulders of shoulder washers 80, 90 may be selected in order to minimize containments from reaching the bearing 40 via gaps 88, 98. For example, the diameters of the shoulders of shoulder washers 80, 90 may be selected to extend beyond a bearing seal (see e.g., ref. 52 in FIG. 5). For example, the diameters of the shoulders of shoulder washers 80, 90 may be at least the diameter of the inner side 45 (FIG. 5) of the outer ring 44 (FIG. 5) of the bearing 40.

In particular embodiments, the shoulder washers 80, 90 further comprises a labyrinth seal 56. The labyrinth seal 56 may suitable comprise one or more grooves and be configured into any desired shape. The labyrinth seal 56 can be employed to prevent dirt and other contaminants from entering gaps 88 and 98.

Figure 10:
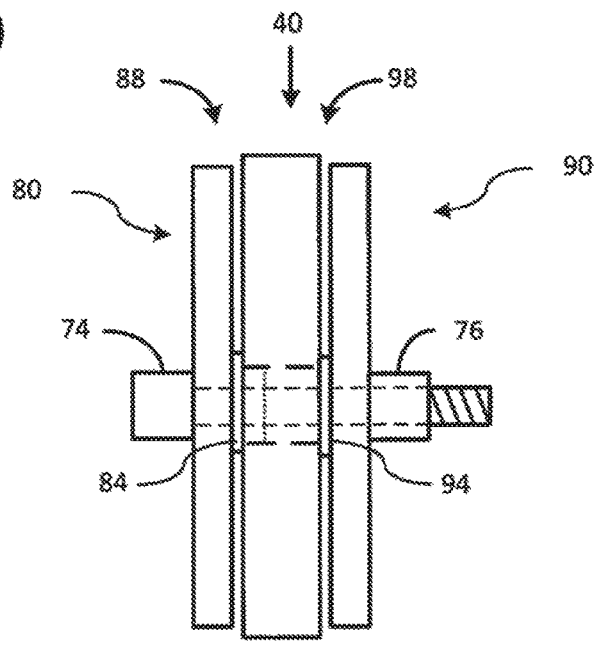
FIG. 10 is a side view of a bearing coupled with a pair of shoulder washers and flat washers.

FIG. 10 is a side view of a bearing 40 coupled with a pair of shoulder washers 80, 90 and flat washers 84, 94. In the illustrated example, the fastener comprises a bolt 74 coupled with a nut 76. However, those skilled in the art should readily appreciate that any suitable fastener may be employed. For example, the shoulder washers 80, 90 and the bearing 40 may be mounted on a shaft which may have threaded end allowing a nut 76 to hold the shoulder washers 80, 90 and the bearing 40 in place, or as another example, the shaft may employ a cotter pin to hold the washers 80, 90 and bearing 40 in place.

Figure 11:
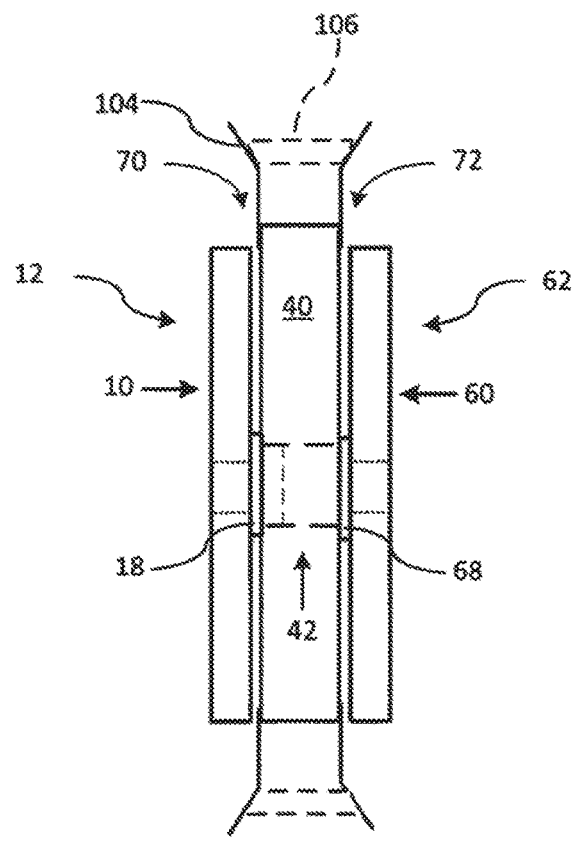
FIG. 11 is a side view illustrating an example of a bearing coupled with a pair of shoulder washers with steps and a pulley.

FIG. 11 is a side view illustrating an example of a bearing 40 coupled with a pair of shoulder washers with steps 10, 60 and a pulley 104. This configuration can be employed for implementing a belt tensioner. When installed, the pulley 104 world engage a belt 106. As mentioned previously, the height of steps 18, 68 determine the size of gaps 70, 72 respectively. The heights may be selected which are the minimum heights to allow the bearing 40 to rotate freely. The widths of the steps 18, 68 may be selected to cover grooves (see e.g., ref. 54 in FIG. 5) to prevent contaminants from entering the bearing via inner ring 42. Similarly, the height of steps 18, 68 and the diameter of shoulders 12, 62 may be selected to minimize the size of gaps 70, 72 to prevent contaminants from entering the bearing via gaps 70, 72 while still allowing the bearing to rotate freely.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
   a shoulder washer that comprises a shank, a shoulder coupled with the shank, a bore passing through the shank and the shoulder, and a step;
   the shoulder having at least one annular groove;
   wherein the step is coupled with the shoulder and at least partially encircles the shank;
   wherein a height of the step is selected to cause a gap of a predetermined size, when the step is engaged with an inner ring of a bearing, between the shoulder and the bearing, and the at least one annular groove forms a labyrinth seal between the shoulder and the bearing.

2. The apparatus set forth in claim 1, wherein the step fully encircles the shank.

3. The apparatus set forth in claim 1, further comprising:
   the bearing further comprising an outer ring, and first and second sides;
   a second shoulder washer, the second shoulder washer comprises:
      a second shank, a second shoulder coupled with the second shank, a second bore passing through the second shank and the second shoulder, and a second step;
      the second shoulder having at least one second annular groove;
   wherein the second step is coupled with the second shoulder and at least partially encircles the second shank;
   wherein the first shoulder washer and second shoulder washer are coupled with the bearing at the first and second sides of the bearing respectively;
   wherein the step on the first shoulder washer engages the inner ring of the bearing on to first side and the second step engages the inner ring of the bearing on the second side; and
   wherein a height of the second step is selected to cause a second gap of a predetermined second size, when the second step is engaged with the inner ring of the bearing on the second side, between the second shoulder and the second side of the bearing, the at least one second annular groove forming a second labyrinth seal between the second shoulder and the bearing.

4. The apparatus set forth in claim 3, wherein the first gap and second gap are equal.

5. The apparatus set forth in claim 3, wherein the shoulder of the first shoulder washer has an outer diameter greater than an inner diameter of the outer ring and less than an outer diameter of the outer ring of the bearing.

6. The apparatus set forth in claim 5, wherein the second shoulder has an outer diameter greater than an inner diameter of the outer ring and less than an outer diameter of the outer ring of the bearing.

7. The apparatus set forth in claim 5, wherein the bearing is sealed by a first seal on the first side of the bearing and a second seal on the second side of the bearing.

8. The apparatus set forth in claim 7, wherein the shoulder of the first shoulder washer has an outer diameter that extends beyond the first seal.

9. The apparatus set forth in claim 8, wherein the second shoulder has an outer diameter that extends beyond the second seal.

10. The apparatus set forth in claim 3, wherein the step on the first shoulder washer extends not more than 0.250 inches away from the shoulder of the first shoulder washer.

11. The apparatus set forth in claim 10, wherein the second steps extends not more than 0.250 inches away from the shoulder of the first washer.

12. The apparatus set forth in claim 3, wherein the step on the first shoulder washer is a minimum length that allows the bearing to move freely.

13. The apparatus set forth in claim 12, wherein the second step is a minimum length that allows the bearing to move freely.

14. The apparatus set forth in claim 3, wherein the shank of the first shoulder washer and the second shank are sized where a combined length of the first and second shanks are not greater than a width of the bearing.

15. An apparatus, comprising:
   a first shoulder washer that comprises a first shank, a first shoulder coupled with the shank, a bore passing through the first shank and the shoulder and the shoulder having at least one annular groove;
   a first flat washer having an inner diameter greater than an outer diameter of the first shank;
   a bearing having an inner ring and an outer ring, and first and second sides;
   a second shoulder washer that comprises a second shank, a second shoulder coupled with the shank, a second bore passing through the second shank and the second shoulder, and at least one second annular groove;

a second flat washer having an inner diameter greater than an outer diameter of the second shank;

wherein the first shoulder washer and second shoulder washer are coupled with the bearing at the first and second sides of the bearing respectively; and wherein the first flat washer is disposed on the first shank and engages the inner ring of the bearing on the first side;

wherein the second flat washer is disposed on the second shank and engages the inner ring of the bearing on the second side wherein the thickness of the first flat washer is selected to cause a gap of a predetermined size when the first flat washer is engaged with an inner ring of the bearing between the shoulder and the bearing, the at least one annular groove forming a labyrinth seal between the shoulder and the bearing where the thickness of second flat washer is selected to cause a gap of a predetermined size when the second flat washer is engaged with an inner ring of a bearing between the second shoulder and the bearing, the at least one second annular groove forming a labyrinth seal between the shoulder and the bearing.

16. The apparatus set forth in claim 15, wherein the thickness of the first washer is not more than 0.250 inches.

17. The apparatus set forth in claim 15, wherein the first flat washer has a first thickness selected to provide a first gap between the shoulder of the first shoulder washer and the bearing that is a minimum gap that allows the bearing to turn freely while the first shoulder washer is engaged with the bearing; and wherein the second flat washer has a second thickness selected to provide a second gap between the second shoulder washer and the second side of the bearing is a minimum gap that allows the bearing to turn freely while the second shoulder washer is engaged with the bearing.

* * * * *